US009615402B2

(12) United States Patent
Wu et al.

(10) Patent No.: US 9,615,402 B2
(45) Date of Patent: Apr. 4, 2017

(54) BASE STATION, NETWORK SYSTEM, AND IMPLEMENTATION METHOD

(75) Inventors: Wangjun Wu, Shanghai (CN); Jun Zhou, Shanghai (CN); Peng Lan, Shanghai (CN); Ziqiang Wang, Shanghai (CN); Jun Xia, Kista (SE); Yongxiang Zhao, Shanghai (CN); Jingyu Wang, Shenzhen (CN); Nengwu Xiang, Shenzhen (CN); Ni Ma, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 753 days.

(21) Appl. No.: 13/478,812

(22) Filed: May 23, 2012

(65) Prior Publication Data

US 2012/0230282 A1 Sep. 13, 2012

Related U.S. Application Data

(63) Continuation of application No. PCT/CN2010/079042, filed on Nov. 24, 2010.

(30) Foreign Application Priority Data

Nov. 24, 2009 (CN) .......................... 2009 1 0188422

(51) Int. Cl.
*H04W 72/04* (2009.01)
*H04W 88/08* (2009.01)
(Continued)

(52) U.S. Cl.
CPC ........... *H04W 88/085* (2013.01); *H04B 7/024* (2013.01); *H04L 5/0037* (2013.01); *H04W 28/16* (2013.01)

(58) Field of Classification Search
CPC ....... H04W 4/00; H04W 28/00; H04W 72/04; H04W 72/121; H04W 72/005;
(Continued)

(56) References Cited

U.S. PATENT DOCUMENTS 8,249,609 B2 * 8/2012 Katori .................. H04W 16/02
370/329
2003/0012158 A1 * 1/2003 Jin ........................ H04J 3/0644
370/335
(Continued)

FOREIGN PATENT DOCUMENTS

CN 101150348 3/2008
CN 101420260 4/2009
(Continued)

OTHER PUBLICATIONS

International Search Report of Corresponding PCT Application PCT/CN2010/079042 mailed Mar. 10, 2011.
(Continued)

*Primary Examiner* — Kwang B Yao
*Assistant Examiner* — Syed M Bokhari
(74) *Attorney, Agent, or Firm* — Staas & Halsey LLP (57) ABSTRACT

A base station includes multiple edge nodes and a central node. The edge nodes are configured to perform communication with a user equipment, and execute baseband processing and mutual conversion between baseband data and radio data, in which the multiple edge nodes belong to one or more edge node groups, and each edge node group includes at least one edge node. The central node is configured to perform communication with the multiple edge nodes, manage the multiple edge nodes, and perform resource sharing so that resources are shared by the multiple edge nodes. The base station is divided into two levels of architecture, namely, a central node and an edge node, and
(Continued)

the central node implements resource sharing so that resources are shared by the edge nodes, so that a resource sharing degree in the base station is enhanced.

33 Claims, 6 Drawing Sheets (51) Int. Cl.
*H04L 5/00* (2006.01)
*H04W 28/16* (2009.01)
*H04B 7/024* (2017.01)

(58) Field of Classification Search
CPC ..... H04W 16/02; H04W 80/00; H04W 28/16; H04W 88/085; H04B 7/216; H04B 7/024; H04L 12/28; H04L 5/0037; H04J 3/06; H04J 3/0605
USPC ..... 370/335, 328, 329, 337; 455/411, 412.1, 455/458, 450
See application file for complete search history.

(56) References Cited

U.S. PATENT DOCUMENTS

| | | | |
|---|---|---|---|
| 2005/0018627 A1* | 1/2005 | Cardei | H04W 72/1257 370/328 |
| 2006/0099972 A1* | 5/2006 | Nair | H04W 36/14 455/458 |
| 2007/0280159 A1 | 12/2007 | Liu et al. | |
| 2008/0153460 A1* | 6/2008 | Chan | H04W 4/12 455/412.1 |
| 2008/0181171 A1* | 7/2008 | Koziy | H04W 88/085 370/328 |
| 2008/0240036 A1 | 10/2008 | Liu et al. | |
| 2009/0323643 A1* | 12/2009 | Jeon | H04B 7/15592 370/337 |
| 2010/0098014 A1* | 4/2010 | Larsson | H04B 7/022 370/329 |
| 2011/0158332 A1 | 6/2011 | Wu et al. | |
| 2012/0093084 A1* | 4/2012 | Wala | H04B 1/18 370/328 |
| 2012/0122424 A1* | 5/2012 | Herscovici | H04L 63/0428 455/411 |
| 2014/0050148 A1* | 2/2014 | Choi | H04L 1/1819 370/328 |

FOREIGN PATENT DOCUMENTS

| | | |
|---|---|---|
| CN | 101534525 | 9/2009 |
| EP | 1 713 290 | 10/2005 |
| JP | 2007-68128 | 3/2007 |
| JP | 2007-526697 | 9/2007 |
| JP | 2007-529926 | 10/2007 |
| JP | 2007-531423 | 11/2007 |
| JP | 2008-147835 | 6/2008 |
| WO | 2009/021434 | 2/2009 |

OTHER PUBLICATIONS

European Search Report issued on Nov. 7, 2012 in corresponding European Patent Application No. 10832647.1.
Japanese Office Action mailed Aug. 6, 2013 in corresponding Japanese Application No. 2012-540272.
3GPP TSG RAN WG1 Meeting #59, "Design on Scrambling Sequence for MU-MIMO", R1-094580, Nov. 9-13, 2009, pp. 1-2.
International Search Report mailed Mar. 10, 2011 issued in corresponding International Patent Application No. PCT/CN2010/079042.
Written Opinion of the International Searching Authority mailed Mar. 10, 2011 issued in corresponding International Patent Application No. PCT/CN2010/079042.
Chinese Office Action mailed Dec. 4, 2012 in corresponding Chinese Patent Application No. 200910188422.5.

\* cited by examiner

BASE STATION, NETWORK SYSTEM, AND IMPLEMENTATION METHOD

CROSS-REFERENCE TO RELATED APPLICATIONS

This application is a continuation of International Application No. PCT/CN2010/079042, filed on Nov. 24, 2010, which claims priority to Chinese Patent Application No. 200910188422.5, filed on Nov. 24, 2009, both of which are hereby incorporated by reference in their entireties.

FIELD OF THE INVENTION

Embodiments of the present invention relate to the communications technology, and in particular, to a base station, a network system, and an implementation method.

BACKGROUND OF THE INVENTION

With the rapid development of mobile broadband, the mobile network is going through unprecedented changes. The mobile standard is gradually evolving from the GSM to the UMTS and LTE. However, due to the factors of market policy and network maturity, these standards will coexist for a long time, which brings new challenges to the design of base station architecture and the operation and maintenance management of base stations. Based on the idea of simplifying the network structure and reducing the overall network cost, network flattening will be a mainstream trend for the future evolution of networks. In this trend, the flattening of a RAN (access network) and downward movement of a part of functions of a core network to a base station for implementation are important development trends. In addition, for problems of capacity, bandwidth, and boundary coverage of the cellular network, some new technologies such as CoMP (Coordinated multi-point, coordinated multi-point) and Relay (relay) keep emerging. These technologies also bring about new requirements for mobile network architecture and base station architecture. Additionally, the rapid growth for mobile bandwidth requirements in hot spot regions greatly increases the number and standards of base stations in these hot spot regions, and the conventional base station architecture and deployment mode will hardly adapt to these changes.

Figure 1:
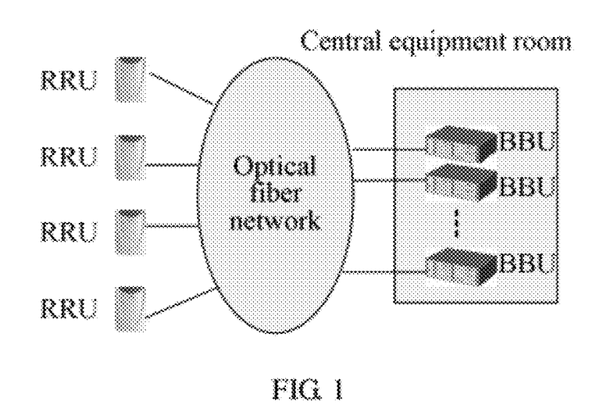
FIG. 1 shows a BBU Hotel solution in the prior art.

An existing solution (namely, a BBU Hotel solution) is shown in FIG. 1. In the solution, a distributed base station is adopted, and the distributed base station is formed of a BBU (baseband unit) and an RRU (remote radio unit). The BBU processes the digital unit part, while the RRU process the radio part. One BBU is connected to multiple RRUs to form one distributed base station. In the BBU Hotel solution, the BBUs in the distributed base stations are deployed in a central equipment room in a centralized manner, and currently several carriers are using such a deployment manner.

The inventors find in the process of implementing the present invention that, due to the deficiencies of the current base station architecture, the BBU Hotel is implemented only in a manner of simply stacking BBUs, and the BBUs are not able to effectively share resources.

SUMMARY OF THE INVENTION

The embodiments of the present invention provide a base station, a base station management method, a network system, and a communication method.

An embodiment of the present invention provides a base station, which includes a central node and multiple edge nodes. The edge node is configured to perform communication with a user, and execute baseband processing and mutual conversion between baseband data and radio data. The multiple edge nodes belong to one or more edge node groups, each edge node group includes at least one edge node. The central node is configured to perform communication with the multiple edge nodes, manage the multiple edge nodes, and perform resource sharing so that resources are shared by the multiple edge nodes.

An embodiment of the present invention further provides a base station management method, in which the base station includes a central node and multiple edge nodes in communication with the central node. The method includes: grouping a part or all of edge nodes of the multiple edge nodes to obtain one or more edge node groups, in which each edge node group includes at least one edge node; configuring the central node as one or more logic central nodes; combining one logic central node and at least one edge node group as one logic network element to obtain one or more logic network elements; and managing the one or more logic network elements.

An embodiment of the present invention further provides a network system, which includes a first base station and a core network, in which the first base station further includes a central node and multiple edge nodes. The edge node is configured to perform communication with a user, and execute baseband processing and mutual conversion between baseband data and radio data. The multiple edge nodes belong to one or more edge node groups, and each edge node group includes at least one edge node. The central node is configured to perform communication with the multiple edge nodes, manage the multiple edge nodes, and perform resource sharing so that resources are shared by the multiple edge nodes.

An embodiment of the present invention further provides a communication method in a network system, in which the network system includes a first base station and a core network, and the first base station includes a central node and multiple edge nodes. The edge nodes perform service communication with a user, and executes baseband processing and mutual conversion between baseband data and radio data. The central node performs communication with the edge nodes, manages the edge nodes, and perform resource sharing so that resources are shared by the multiple edge nodes. In the method, the edge nodes of the first base station perform communication with the core network through the central node.

In the embodiments of the present invention, the base station is divided into two levels of architecture, namely, a central node and an edge node, and the central node implements resource sharing so that resources are shared by the edge nodes, so that a resource sharing degree in the base station is enhanced.

BRIEF DESCRIPTION OF THE DRAWING

To illustrate the technical solutions according to the embodiments of the present invention or in the prior art more clearly, the accompanying drawings for describing the embodiments or the prior art are introduced briefly in the following.

FIG. 2b is a schematic structural diagram of a central node in FIG. 2a;

FIG. 2c is another schematic structural diagram of the central node in FIG. 2a;

DETAILED DESCRIPTION OF THE EMBODIMENTS

The inventors find through analysis that, in the BBU Hotel solution, because the BBUs are completely independent from each other and are only simply stacked, resource sharing so that resources are shared by the BBUs cannot be implemented, and it is difficult to perform highly effective exchange of service data among the BBUs. Furthermore, from the angle of network management, the BBU management granularity (namely, the minimal management object) is also fixed and cannot be flexibly adjusted.

It can be predicted that multiple communication standards will coexist for a period of time. In a multi-standard base station, if such a BBU Hotel solution is adopted, new problems are further introduced. Because the BBU needs to support multiple standards, for example, the GSM and the UMTS, while different standard boards of a same station are usually placed in a same BBU, the BBU expansion is limited by the physical space. In addition, in a multi-standard base station, the requirement of clock synchronization among the BBUs is higher. A usable clock synchronization method is that, each BBU is connected to one external GPS clock, which, however, increases the networking cost.

The network flattening is a mainstream trend of future evolution of the network, and in such an evolutionary trend, a part of functions which are previously implemented at the core network may be moved downward to the base station to implement. Meanwhile, a radio access network is also gradually evolving in the direction of being intelligent. To support such an evolutionary trend, the base station needs to implement a large number of newly added network service functions, and currently the mainstream implementation manner is to implement the network service functions at the BBU. In practical applications, to improve the bandwidth for a single user, the coverage of the base station gradually becomes smaller and the deployment density becomes higher. If each BBU implements the network service functions, the cost of each base station increases, further increasing the construction cost of the entire network. At present, most of the network service functions have the characteristics of complicated protocols and frequently changing protocols. If these functions are all implemented at the base station, the base station equipment needs to frequently upgrade in a large scale, which increases the operating cost of the carriers.

The technical solutions in the embodiments of the present invention are clearly and completely described in the following with reference to the accompanying drawings.

Figure 2A:
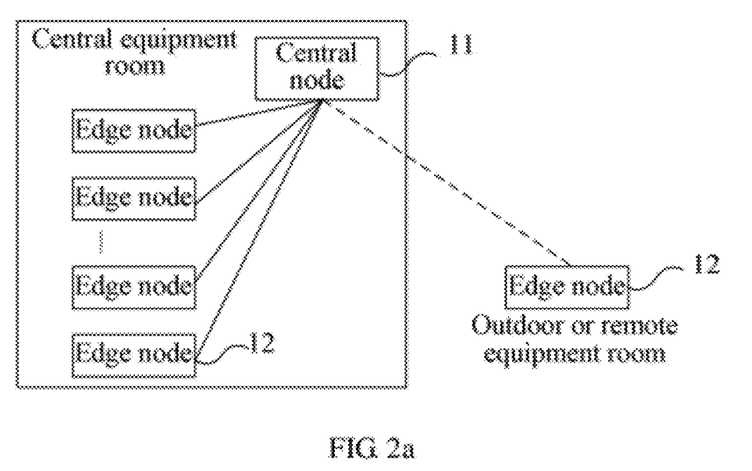
FIG. 2a is a schematic structural diagram of a base station according to an embodiment of the present invention.

FIG. 2a is a schematic structural diagram of a base station according to an embodiment of the present invention. As shown in FIG. 2a, in this embodiment, the base station includes: a central node 11 and multiple edge nodes 12. An edge node 12 is configured to perform communication with a user, and execute baseband processing and mutual conversion between baseband data and radio data. The multiple edge nodes 12 belong to one or more edge node groups (or subgroups), and each edge node group includes at least one edge node. The central node 11 is configured to perform communication with the multiple edge nodes 12, manage the multiple edge nodes, and perform resource sharing so that resources are shared by the multiple edge nodes. The central node can obtain the resource condition of each edge node of the base stations, for example, the edge node reports its resource condition to the central node, or the central node detects the resource condition of the edge node. The resource condition of an edge node specifically may include a static configuration situation and a dynamic use situation. When a resource shortage situation occurs on one edge node, the central node forwards data corresponding to the edge node to an edge node having idle resources to process, for example, forwards, to other edge nodes, data that goes beyond the processing capability of the edge node, that is, forwards the part of data that the edge node fails to process due to insufficient resources, thereby implementing resource sharing so that resources are shared by the edge nodes. For example, when the central node obtains that a baseband processing resource of one edge node is insufficient, the central node can forward baseband data in the edge node to other edge nodes having idle baseband resources to process. Through the base station provided in this embodiment, the edge node at least can perform baseband processing and mutual conversion between baseband data and radio data, and when a processing resource, for example, a baseband resource, of one edge node is insufficient, the resources of other edge nodes may be acquired through the central node to assist processing. It is easy to understand that, in the field of radio communications, that the edge node 12 is configured to perform communication with a user includes the following: the edge node 12 is configured to receive radio data sent by a user through an air interface; or the edge node 12 is configured to send radio data to a user through an air interface; or the edge node 12 is configured to receive radio data sent by a user through an air interface and send radio data to a user through an air interface.

It should be noted that in the embodiment of the present invention, the process of mutual conversion between baseband data and radio data may include intermediate frequency processing. The intermediate frequency processing may also be omitted, and the conversion between baseband data and radio data can be directly implemented in a zero intermediate frequency manner.

In this embodiment, the central node 11 and the edge nodes are interworked in a star manner, that is, the central node 11 is connected to each edge node 12. In a same edge node group, the edge nodes further performs communication and interaction (that is, the interaction of protocol data) through the central node. The protocol data includes control plane data and user plane data. In addition, if the base station only provides one communication standard, that is, each edge node 12 only provides one communication standard, the central node 11 can further provide some public services to implement resource sharing so that resources are shared by the edge nodes. For example, the central node 11 can provide one or more types of processing such as signaling protocol processing, data encapsulation processing, IPsec (IP Security, IP security protocol) processing. If the base station supports multiple communication standards, in consideration of decoupling among different standards, to reduce the inferences on other standards potentially caused by operations such as upgrade on one standard, exemplarily, standard-related processing such as signaling protocol processing and data encapsulation processing can be implemented at the edge node, and processing such as IPsec that is not related to the standard can still be implemented at the central node. Through the above manners, some processing resources of the central node can be shared by the edge nodes.

Correspondingly, central node can further provide a standard interface configured to communicate with the core network directly or indirectly, and specifically, the interface type depends on the communication standard supported by the base station. In the case of an LTE standard, the standard interface can be an S1 interface, and the base station is directly connected to an S-GW/MME in the core network through the S1 interface, in which the S-GW is a service gateway configured to provide services for a user plane, the MME is a mobile management entity configured to provide services at a control plane, and the S-GW and the MMEM coexist, and can be located at one physical entity and can also be located at different physical entities during the implementation. In the case of a UMTS standard, the standard interface can be an Iub interface, the base station is connected to a base station control device (in a UMTS standard, the base station control device is specifically a radio network controller RNC) through the Iub interface, and is connected to the core network through the base station control device. If the base station supports multiple standards, the central node can provide multiple standard interfaces, for example, when the base station supports the LTE standard and the UMTS standard, the central node can provide an S1 interface and an Iub interface at the same time.

In the trends that the network evolves to flattening and the radio access network evolves in the direction of becoming intelligent, the base station needs to implement a large number of newly added network service functions, which include LBO (Local breakout, local breakout), DPI (Deep Packet Inspect, deep packet inspect), and network cache (cache), and so on. To adapt to such development trends, in this embodiment, the central node 11 further supports a part or all of these foregoing network function services, for protocol data of a user getting access through the edge node 12, the operations of one or more network service functions such as LBO, DPI, and network cache are performed at the central node 11.

At a physical position, the central node 11 is deployed at an equipment room, for example, a central equipment room. The multiple edge nodes 12 can all be deployed at the central equipment room, and can also be partially deployed at the central equipment room and partially deployed at a remote equipment room or outdoors, which is not limited in the embodiments of the present invention. The base station is divided into two level of structures, namely, a central node and an edge node, no matter where the edge nodes are, the central node can implement on the edge nodes (or edge node groups) the management such as configuration management and alarm management.

The connections inside the base station in the embodiments of the present invention, that is, the interworking between the central node and the edge nodes, can be implemented through a user-defined interface. For example, the central node 11 and the edge nodes 12 are interworked in a P2P (point-to-point) manner. The central node 11 manages each edge node 12 or each edge node group through the user-defined interface, and the protocol data transmission between the central node 11 and the edge nodes 12 as well as the protocol data exchange among different edge nodes 12 can also be performed through the P2P connection.

For management requirements, the central node 11 further supports the function of grouping edge nodes 12. During the grouping, the central node can perform grouping according to different standards, for example, perform grouping according to a carrier coordinated multi-point (COMP) plan; or perform grouping according to practical operating physical areas of a carrier; or perform grouping according to management requirements of different communication standard; or perform grouping according to a sharing strategy in which multiple carriers operate a radio access network together; or perform grouping according to other requirements. One or more groups of edge nodes may exist. In one grouping manner, for example, during grouping according to the communication standards, if more edge node groups exist, each of at least two groups of the multiple edge node groups supports a different communication standard. For example, a first group supports the UMTS standard, a second group supports the LTE standard, and furthermore, a third group that supports the GSM standard may also exist. It is easy to understand that, in such a grouping situation, the edge nodes that belong to a same edge node group support the same standard. For the first group, the edge nodes of the first group support the UMTS standard, and for the second group, the edge nodes of the second group support the LTE standard.

In this embodiment, strict clock synchronization further needs to be guaranteed among the edge nodes belong to a same edge node group. Therefore, upon acquiring clock synchronization information, the central node 11 sends a reference clock to the edge nodes 12 in one or more edge node groups, and synchronization can be implemented among the edge nodes that belong to a same group based on the reference clock.

During specific implementation, compared with a conventional base station, the base station in this embodiment includes a central node and edge nodes. The edge nodes at least need to perform baseband processing and mutual conversion between baseband data and radio data. The edge node can be implemented on the basis of a conventional base station. For example, the conventional base station is upgraded to obtain edge nodes, and the upgrade is mainly to add internal management protocols between the edge nodes and the central node. The central node is one newly created entity (or a network element). The basic functions of the central node are to perform communication with the edge nodes, manage the edge nodes (or edge node groups), and implement resource sharing, for example, baseband resource sharing, among different edge nodes. It is easy to understand that the specific form of the edge node can be the same as that of the conventional base station. For example, the edge node can be a distributed base station (BBU+RRU), a macro base station, an integrated base station (a radio part and a baseband part are integrated on one board), a micro base station (Micro), or a pico base station (Pico), or a base station in any other form, such as a femto base station (femto), which is not limited in the embodiments of the present invention. It can be understood that, according to the embodiment of the present invention, when the edge node adopts a distributed base station manner, the edge node includes a BBU and an RRU, and BBUs among different edge nodes can be grouped into one baseband resource pool.

Figure 2B:
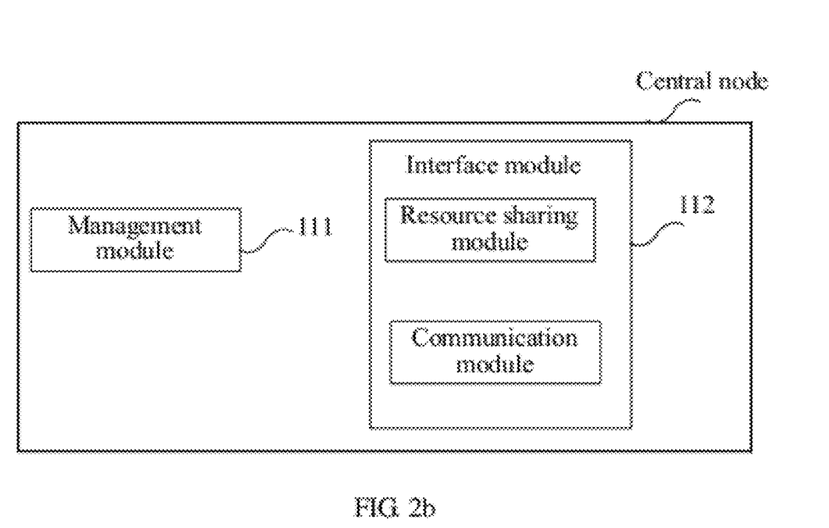

The central node 11 can use the structure shown in FIG. 2b. The central node 11 can include the following modules: a management module 111, configured to manage the edge nodes; and an interface module 112, configured to provide interfaces between the central node and the edge nodes. Specifically, the interface module 112 can include a resource sharing module and a communication module, in which the resource sharing module is configured to acquire resource conditions of the edge nodes, and according to the resource conditions, implement resource sharing so that resources are shared by multiple edge nodes, and the communication module is configured to implement communication between the central node and the edge nodes.

Furthermore, the management module 111 can further perform management on the central node. The management on the edge nodes and the central node by the management module 111 can specifically include configuration management, alarm management, and so on.

Figure 2C:
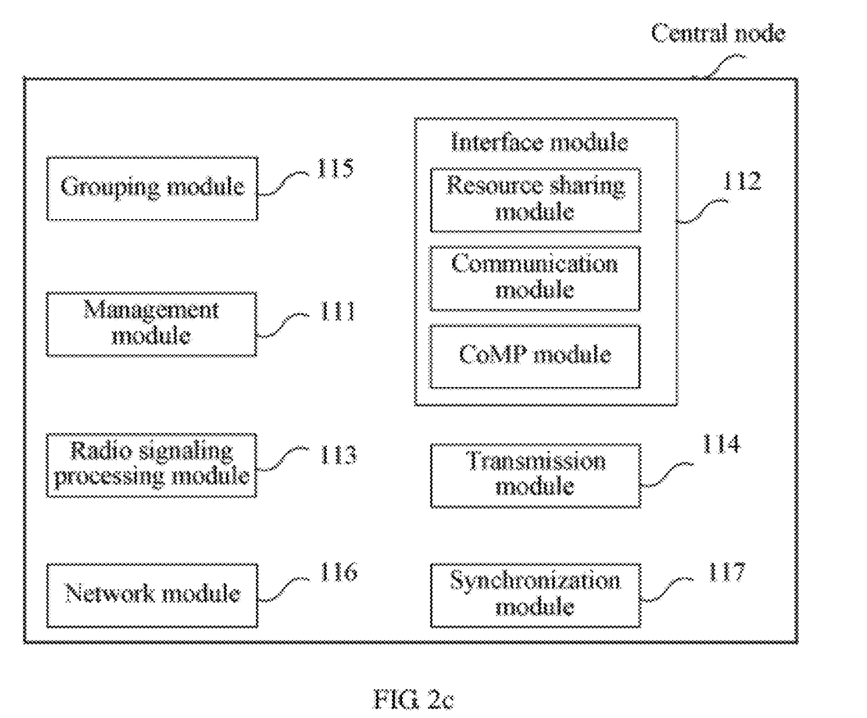

Another structure of the central node 11 is shown in FIG. 2c. The central node 11, in addition to including the management module 111 and the interface module 112, on the basis of FIG. 2b, can further add at least one of a radio signaling processing module 113, a transmission module 114, a grouping module 115, a network module 116, and a synchronization module 117. The radio signaling processing module 113 is configured to perform communication with a core network or a base station control device, and can specifically include processing related to the signaling protocol. The transmission module 114 is configured to perform functions related to radio transmission, and the functions related to radio transmission can specifically include data encapsulation processing, IPsec processing, and so on. The grouping module 115 is configured to group the edge nodes, and during specific applications, the grouping module can group the edge nodes according to different standards. The network module 116 is configured to provide a network service function for each edge node, in which the network service function includes at least one of the following functions: local breakout, deep packet inspect, and network cache. The synchronization module 117 is configured to provide a reference clock for edge nodes of the one or more edge node groups.

Through the user-defined interface, for example, an interface supporting the P2P protocol, protocol data exchange can be implemented between the central node 11 and the edge nodes 12. In consideration of a possible great amount of data exchange between the edge nodes, based on the specific implementation manner of each central node, the interface module 113 can further include: a CoMP module, configured to provide an interface supporting the CoMP protocol. Correspondingly, the edge nodes can further provide an interface supporting the CoMP protocol, and through the CoMP protocol, data exchange can be performed among different edge nodes that belong to a same edge node group.

In this embodiment, the base station is divided into two level of structures, namely, a central node and an edge node, and resource sharing between the central node and the edge nodes is implemented. Also, the edge nodes can belong to different groups to adapt to multiple different application scenarios, and meet various requirements of carriers. Furthermore, a part of functions are implemented at the central node in a centralized manner, so the resource sharing degree of the base station is enhanced.

Figure 3:
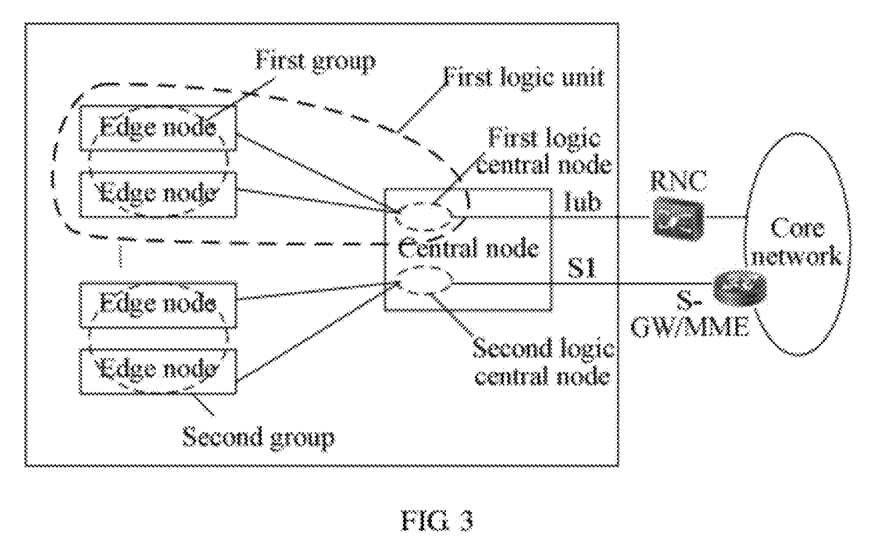
FIG. 3 is a schematic diagram of a logic network element in an implementation of the present invention.

FIG. 3 is a schematic diagram of a logic network element in a base station provided in an embodiment of the present invention. As shown in FIG. 3, in this embodiment, the base station includes a central node and multiple edge nodes, and the multiple edge nodes are divided into two groups. In this embodiment, it is assumed that the base station supports the UMTS standard and the LTE standard, and between the base station and a core network, further an RNC (radio network server) is set for the UMTS standard and an S-GW/MME is set for the LTE standard.

For a conventional base station, for example, taking a distributed base station as an example, each BBU is connected to RRUs to form one base station having distributed architecture. With the development of mobile broadband, the number of base stations grows bigger, and the deployment density becomes higher, which cause a great difficulty to the networking and operation and maintenance management of carriers.

In this embodiment, the function of combining multiple edge node groups to construct a logic network element is supported, which can reduce the management complexity. Specifically, the central node can be configured into multiple logic central nodes, and one implementation manner of the logic central node is to divide physical resources of the central node to form logic resources, and implement isolation of the logic resources through technical measures, so as to virtualize multiple logic central nodes in the central node. One logic central node and at least one edge node group are combined to form one logic network element, as shown in FIG. 3, the central node has a first logic central node and a second logic central node, a first edge node group and the first logic central node can be combined to form a first logic network element. In addition, a second edge node group and the second logic central node can also be combined to form a second logic network element.

Each logic network element is directly or indirectly connected to a core network through a respective interface. For example, the first logic network element is connected to a base station control device through an Iub interface, and the base station control device is connected to the core network. The second logic network element can be connected to the core network through an S1 interface. Each logic central node can provide corresponding edge node groups with some public services, for example, one or more types of processing such as signaling protocol processing, data encapsulation processing, and IPsec processing.

Inside one logic network element, the interworking between the logic central node and the edge nodes can be implemented through a user-defined interface. For example, the central node and the edge nodes are interworked in a P2P (point-to-point) manner. The function of the edge node can be regarded as a subset of the function of a conventional base station, which mainly implements processing of radio baseband and intermediate radio frequency. The management of edge node is implemented at the logic central node. For example, the logic central node performs configuration management, alarm management, and so on the edge nodes belonging thereto and resource sharing so that resources are shared by the multiple edge nodes. In addition, transmission of protocol data, for example, baseband data between the logic central node and the edge nodes can also be performed through the user-defined interface. If the logic central node and the edge nodes further provide an interface supporting the CoMP protocol or the user-defined interface further supports the CoMP protocol, the logic central node and the edge nodes can further perform data transmission through the CoMP protocol, so that the higher transmission efficiency can be achieved.

In the embodiments of the present invention, the logic central node and the edge node groups are combined to form a logic network element. From the angle of the network management or core network, as the logic network element, just like the conventional base station, can be used as one independent basic management object, the number of management objects can be reduced, so the requirements for network management and the core network can be lowered. In addition, as in the logic network element the number of edge nodes that provide services for a user can be flexibly adjusted according to requirements, the scale of the base station can be customized by carriers accordingly, which provides great conveniences to the operation and maintenance of carriers. Furthermore, this embodiment can further support an operating manner in which multiple carriers share one network (RAN sharing), that is, in a same base station, different logic network elements can be operated and maintained by different carriers.

Figure 4:
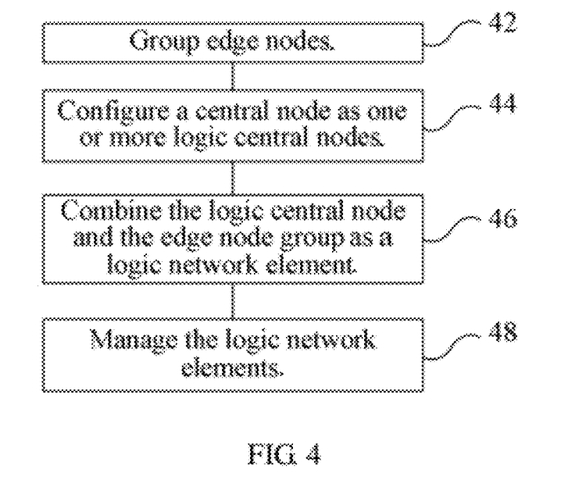
FIG. 4 is a schematic diagram of a base station management method according to an embodiment of the present invention.

An embodiment of the present invention further provides a base station management method, in which the base station includes a central node and multiple edge nodes, and the central node and the edge nodes are interworked in a star manner. As shown in FIG. 4, the method includes the following steps:

Step 42: Group Edge Nodes.

Multiple standards of grouping edge nodes may exist, which may flexibly implement grouping based on various applications. For example, the grouping may be performed according to a carrier coordinated multi-point (CoMP) plan; or the grouping may be performed according to a practical operating physical area of a carrier; or the grouping may be performed according to management requirements of different communication standards; or the grouping may be performed according to a sharing strategy in which multiple carriers operate a radio access network together. In addition, the grouping may be further performed according to other requirements of carriers.

During the grouping, all edge nodes may be selected for grouping, and also a part of edge nodes may be selected for grouping. After the grouping is performed, one or more edge node groups exist in the base station, in which each edge node group includes at least one edge node.

Step 44: Configure a Central Node as One or More Logic Central Nodes.

The physical resources of the central node are divided to form logic resources, and the isolation of each logic resource is implemented, so as to virtualize, in the central node, one or more logic central nodes.

Step 46: Combine a Logic Central Node and a Edge Node Group as a Logic Network Element.

Specifically, one logic central node and at least one edge node group are combined as one logic network element, so that one or more logic network elements may be obtained from the base station in this embodiment.

Step 48: Manage the Logic Network Elements.

The management specifically may include at least one of the following: resource allocation management and operation and maintenance management.

For the resource allocation management, because the number of edge nodes that provide services for a user in a logic network element may be flexibly adjusted according to requirements, the scale of a base station may be customized by carriers accordingly, so that resource allocation is flexibly implemented and great conveniences are provided for operation and maintenance of carriers.

For the operation and maintenance management, in operation and maintenance management of a base station, a conventional base station, for example, one distributed base station, may be regarded as one basic management object, and in this embodiment, a logic network element may also be regarded as one basic management object, and a logic network element is used as a basic management object for management, so that the number of management objects may be effectively reduced and the requirements for network management and the core network are reduced.

Furthermore, inside the logic network element, the logic central node manages the edge node groups, and the management includes configuration management and alarm management.

It is easy to understand that, inside a logic network element, because the central node and the edge nodes of an edge node group are interworked in a star manner, the edge nodes of the group perform communication and interaction, namely, exchange of protocol data, through the logic central nodes.

Inside one logic network element, the central node may further implement resource sharing so that resources are shared by the edge nodes that belong to a same edge node group.

Inside the base station, especially, in a same edge node group, to implement clock synchronization, the method in this embodiment may further include: performing clock synchronization on the edge node groups through the logic central node, that is, inside the logic network element, outputting, by the logic central node, a reference clock to the edge nodes of a corresponding edge node group, so as to implement synchronization of edge nodes of one edge node group.

In addition, the method in this embodiment may further include: providing any one of the one or more logic central nodes with at least one interface for communication with a core network. For example, in FIG. 3, the first logic central node performs exchange with a base station control device through an Iub interface, and performs interaction with the core network through the base station control device, and the second logic central node directly performs interaction with the core network through an S1 interface.

During the grouping of edge nodes, because a part of edge nodes may be grouped, after the grouping is performed, several independent edge nodes which do not belong to an edge node group remain, so that the remaining edge nodes may be further configured as an independent base station, that is, each remaining edge node independently serves as one base station, and performs transparent transmission of protocol data between the independent base station and the core network through the central node. The independent base station and the central node may be connected through a standard interface. If the independent base station supports an LTE standard, the independent base station and the central node may be interworked through an S1 interface. If the independent base station supports a UMTS standard, the independent base station and the central node may be interworked through an Iub interface.

Figure 5:
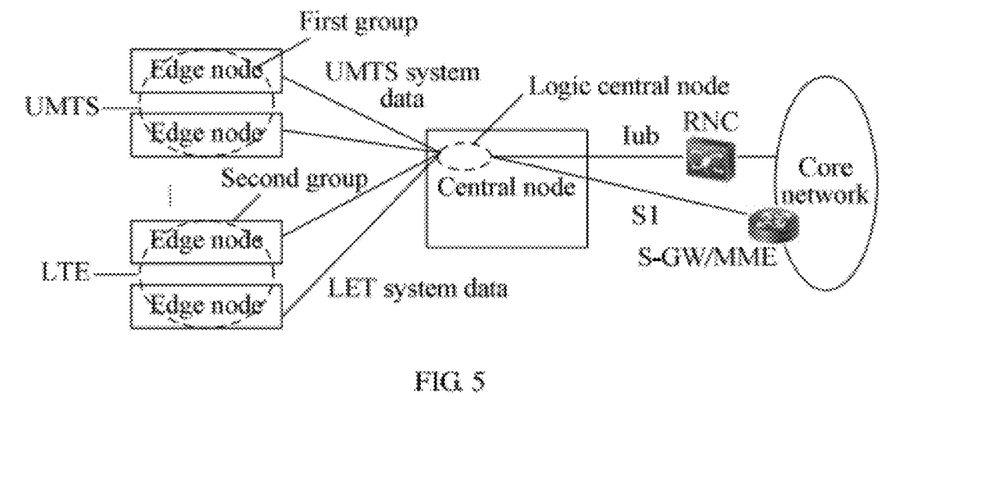
FIG. 5 is a schematic structural diagram of a multi-mode base station according to an embodiment of the present invention.

FIG. 5 is a schematic structural diagram of a multi-mode base station according to an embodiment of the present invention. As shown in FIG. 5, the multi-mode base station supports the UMTS standard and the LTE standard. Persons skilled in the art should understand that FIG. 5 is only an example, and in this implementation, the multi-mode base station may support two or more communication standards, and the communication standards may further be other standards such as a GSM standard, in addition to the UMTS standard and the LTE standard. In this implementation, the multi-mode base station includes a central node and multiple edge nodes, the central node and the multiple edge nodes are connected in a star manner, and the multiple edge nodes belong to multiple edge node groups. At least two edge node groups support different standards, and in the central node, logic central nodes are virtualized for the at least two edge node groups supporting different standards. The logic central nodes are interworked with the at least two edge node groups supporting different standards, and interworked with the core network. For example, at least two different interfaces are provided for direct or indirect interworking with the core network.

Specifically, as shown in FIG. 5, the multi-mode base station includes a central node and two edge node groups. Each edge node in a first group supports the UMTS standard, and each edge node in a second group supports the LTE standard. The central node has at least one logic central node, in which one logic central node is connected to the first group and the second group. The connect can be implemented through a user-defined interface. In addition, the logic central node is further connected to the core network. Specifically, as the multi-mode base station supports the UMTS standard and the LTE standard, the logic central node supports two standard interfaces, in which one interface is an Iub interface, and the other interface is an S1 interface. The logic central node is connected to the base station control device through the Iub interface, and the base station control device is connected to the core network, so that the logic central node and the core network can exchange data related to the UMTS standard; while the logical central node and the core network can directly exchange data related to the LTE standard through the S1 interface.

The multi-mode base station provided in an embodiment of the present invention can be simply and conveniently implemented, and can further flexibly adjust the capacity of the base station according to service demand amounts of different standards.

In the multi-mode base station provided in this embodiment, mutual conversion between baseband data and radio data and baseband processing can be implemented at the edge node. Furthermore, the standard-related processing such as signaling protocol processing and data encapsulation processing can also be implemented at the edge node, while processing that is not related to the IPsec can still be implemented at the central node. Therefore, the resource sharing so that resources are shared by edge nodes that belong to a same standard can be implemented at the central node, and mutual interferences among various standards in the multi-mode base station can also be effectively reduced.

In addition, the multi-mode base station can further include independent edge nodes. The edge nodes do not belong to the group discussed in the foregoing, which can support standards same as the existing groups, and can also support different standards. Each independent edge node can be regarded as one independent base station. The independent base station is connected to the central node of the multi-mode base station, for example, connected to the central node through a standard interface. The type of the interface depends on the communication standards supported by the independent base station. For the LTE standard, the standard interface can be an S1 interface. The central node performs transparent transmission of protocol data between the independent base station and the core network.

Figure 6:
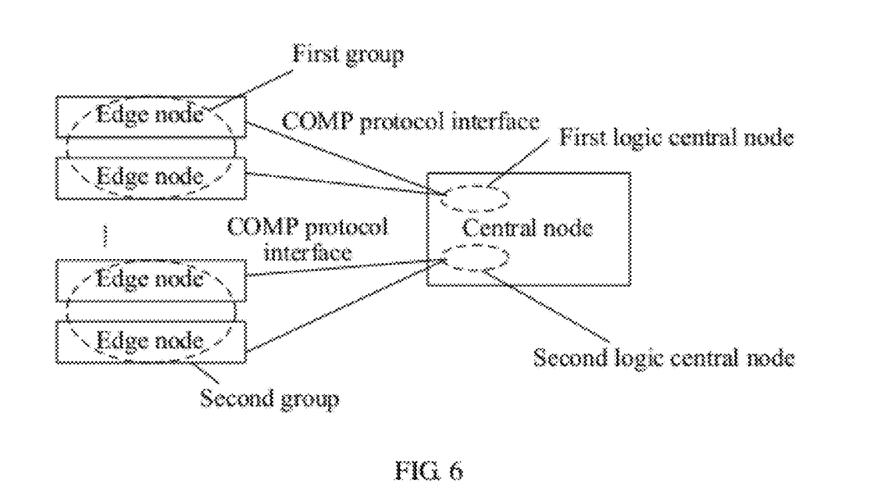
FIG. 6 is a schematic diagram of interworking of edge nodes of a base station according to an embodiment of the present invention.

FIG. 6 is a schematic diagram of edge node interworking of a base station according to an embodiment of the present invention. As one of the future mainstream technologies of the radio network, the CoMP technology can effectively improve the capacity and bandwidth of a cellular network, and the effect is especially significant for users at edges of a cell. The CoMP technology requires a large amount of data exchanged among relevant base stations. In the base station in this embodiment, the edge nodes are connected to the central node, and the support of the CoMP protocol is further added through a user-defined interface between an edge node and the central node, thereby implementing highly effective exchange of CoMP data among the edge nodes, and providing technical possibility for the application of the CoMP technology.

In practical operations, it is very difficult to implement highly effective exchange among all base stations, and the cost is very high. To guarantee necessary highly effective exchange among the base stations, as shown in FIG. 6, according to an embodiment of the present invention, the edge nodes of a base station may belong to different edge node groups. For example, each of a first group and a second group has multiple edge nodes. Inside a same group, on the basis of the user-defined interface, all the edge nodes can further add the support of the CoMP protocol or provide an interface supporting the CoMP protocol. If the central node also supports the CoMP protocol, the edge node can implement highly effective interconnection with the central node through the CoMP protocol, so as to form one CoMP area. The highly effective exchange of CoMP data can be performed among the edge nodes that belong to a same group, thereby improving the capacity and bandwidth of a cellular network, and further accelerating the mobile broadband. It should be noted that, the edge nodes that belong to a same group may all be configured as an independent base station. In this case, highly effective exchange of data can be implemented among the independent base stations. Alternatively, the edge nodes that belong to a same group and the logic central node form one logic network element. In this case, highly effective exchange of data can be implemented among the edge nodes that belong to a same logic network element.

Figure 7:
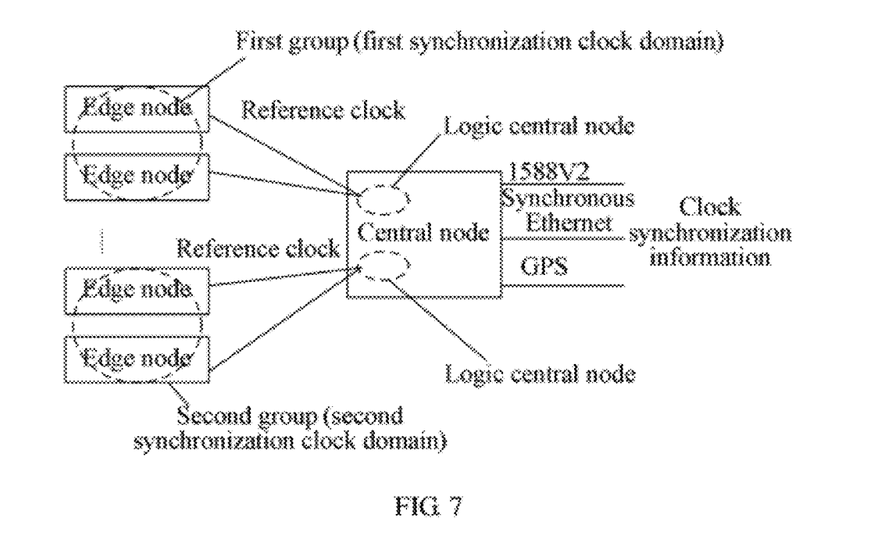
FIG. 7 is a schematic diagram of synchronization of a base station according to an embodiment of the present invention.

The base station provided in an embodiment of the present invention includes a central node and multiple edge nodes. The requirement of clock synchronization needs to be met between the central node and the edge nodes. Especially, during grouping of the edge nodes, strict clock synchronization needs to be guaranteed for the edge nodes that belong to a same group. FIG. 7 is a schematic diagram of clock synchronization of a base station according to an embodiment of the present invention. As shown in FIG. 7, the central node acquires clock synchronization information and outputs a reference clock to each edge node group, and synchronization is performed for the edge nodes that belong to each edge node group through the reference clock.

Specifically, the central node can acquire clock synchronization information in multiple manners, for example, in a 1588V2, synchronous Ethernet or GPS manner, the clock synchronization information of the central node is processed to recover one reference clock, and the reference clock is provided to each edge node group. If the central node has multiple logic central nodes, each logic central node outputs the reference clock to the corresponding edge node groups (that is, groups connected to the logic central node), and the corresponding edge node groups implement synchronization of the edge nodes that belong to the groups through the reference clock. After the synchronization is performed, the first group of edge nodes belongs to a first synchronization clock domain. After the synchronization is performed, the second group of edge nodes belongs to a second synchronization clock domain. Generally speaking, the first synchronization clock domain and the second synchronization clock domain have the same clock. In this embodiment, the central node provides a reference clock for the edge node groups, and as the scale of the edge node group can be flexibly set according to requirements, the size of the synchronization range can be flexibly adjusted.

Figure 8:
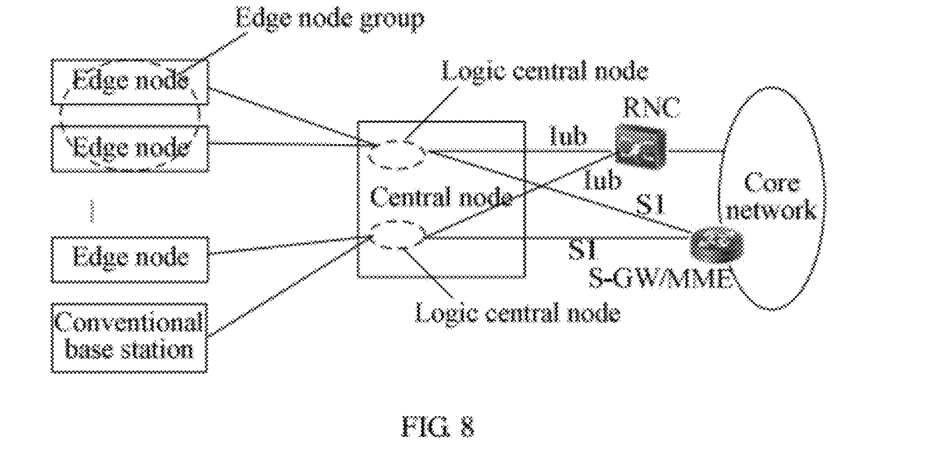
FIG. 8 is a schematic structural diagram of a network system according to an embodiment of the present invention.

FIG. 8 is a schematic structural diagram of a network system according to an embodiment of the present invention. As shown in FIG. 8, the network system includes a first base station and a core network. The first base station specifically includes a central node and multiple edge nodes connected to the central node. In this embodiment, the edge node is configured to perform communication with a user, in which the multiple edge nodes belong to one or more edge node groups, and each edge node group includes at least one edge node. The central node is configured to manage the one or more edge node groups, perform communication with the multiple edge nodes, and perform resource sharing so that resources are shared by the multiple edge nodes.

In this embodiment, the specific implementation of the first base station can be referred to the description of the embodiments in FIG. 2a to FIG. 2c, which are no longer described in detail here. If the first base station supports the LTE standard, the core network includes an S-GW/MME, and the first base station is connected to the S-GW/MME. If the first base station supports the UMTS standard or the GSM standard, the network system further includes a base station control device, the first base station is connected to the base station control device, and the base station control device is connected to the core network. For the UMTS, the base station control device is an RNC, whereas for the GSM, the base station control device is a BSC (Base station controller, base station controller). If the first base station supports multiple standards, for example, when the first base station supports the LTE standard and the UMTS standard, the network system can include an RNC and an S-GW/MME.

The central node in the first base station can be configured as one or more logic central nodes. One logic central node and one or more edge node groups may form one logic network element. Inside the logic network element, the logic central node and the edge nodes perform communication through a user-defined interface, and the logic network element (or a logic central node) is further connected to the core network or base station control device through a standard interface, so as to perform communication with the core network, for example, connected through an Iub interface and an RNC, or connected through an S1 interface and an S-GW/MME.

Furthermore, the network system can further include independent edge nodes. The independent edge nodes and the logic central nodes are not combined as a logic network element, and instead, are configured as an independent base station. It should be noted that the independent base station, in addition to implementing baseband processing and mutual conversion between baseband data and radio data, further needs to perform main control and transmission processing that a conventional base station does. The central node in the first base station is further configured to perform transparent transmission of protocol data between the independent base station and the core network. To adapt to the trends of evolution of the network towards flattening and the evolution of the radio access network in the direction of becoming intelligent, for the independent base station, a part of network service functions can be performed by the central node in the first base station, so that in this embodiment, the central node of the first base station can further support a network service function of services of an independent base station. Specifically, the network service function includes at least one of the following functions: local breakout, deep packet inspect, and network cache.

In consideration of the inventory equipment on the network, to implement compatibility with the inventory equipment to implement smooth evolution of the network, in this embodiment, the network system can further include a conventional base station. The conventional base station is directly connected to the central node of the first base station, and in the connection, a standard interface, for example, an S1 interface or an Iub interface can be adopted, which specifically depends on the standard of the conventional base station. The central node in the first base station is further configured to perform transparent transmission of protocol data between the conventional base station and the core network, and at this time, the central node plays a role of transmission convergence. In addition, for the conventional base station, the coverage area thereof and the user data also have the requirements for network service functions, and the central node further supports corresponding network service functions, for example, one or more of local breakout, deep packet inspect, and network cache. Due to the similarities between the independent base station and the conventional base station, in this embodiment, the independent base station and the conventional base station can be referred to as a second base station in general.

The central node in the first base station, in addition to providing logic central nodes for logic network elements, for independent base stations configured from edge nodes and existing conventional base stations on the network, can further provide additional logic central nodes. The independent base station and the conventional base station can share the same logic central node, and may apply different logic central nodes, which is not limited in the embodiments of the present invention.

In the embodiment of the present invention, as the base station type of the network system might further include the independent base station and/or conventional base station in addition to the first base station, and either the independent base station or the conventional base station is connected to the central node in the first base station, the central node in the first base station further provides traffic identification function, that is, identifies protocol data from different base stations for subsequent corresponding processing. For example, for the edge nodes of the first base station, the central node supports one or more types of processing such as signaling protocol processing, data encapsulation processing, and IPsec processing. For the independent base station, the central node performs transparent transmission of protocol data between the independent base station and the core network. For the conventional base station, the central node performs transparent transmission of protocol data between the conventional base station and the core network. Therefore, on the basis of various implementations in the corresponding embodiments in FIG. 2b or FIG. 2c, the central node can further include an identification module configured to identify protocol data from different base stations.

Figure 9:
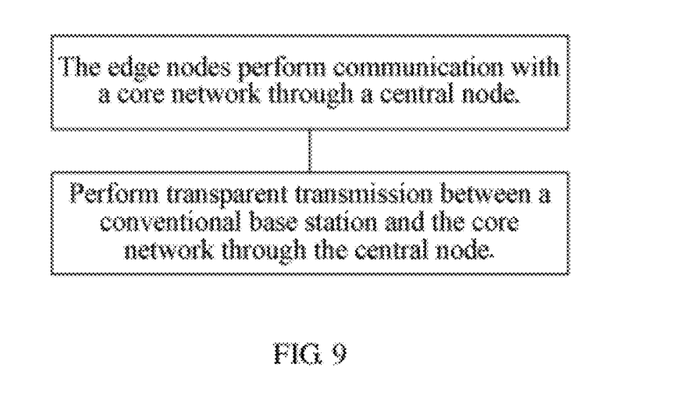
FIG. 9 is a schematic diagram of a network system communication method provided in an embodiment of the present invention.

FIG. 9 is a schematic diagram of a network system communication method provided in an embodiment of the present invention. The network system can be as shown in FIG. 8, which includes a first base station and a core network. The communication method includes: edge nodes of a first base station performing communication with a core network through a central node, in which, specifically, in the network system, the multiple edge nodes are divided into one or more edge node groups, and each edge node group includes at least one edge node; configuring the central node as one or more logic central nodes; any one of the one or more logic central nodes in the central node performing communication with at least one edge node group; the any one of the one or more logic central nodes performing communication with the core network directly, or the any one of the one or more logic central nodes being connected to a base station control device, and performing communication with the core network through the base station control device. Inside the first base station, protocol data is exchanged among different edge nodes that belong to a same edge node group through the central node. In one grouping strategy, for example, grouping according to management requirements of different communication standards, the edge nodes that belong to a same edge node group support the same communication standard.

In addition, when the network system further includes an independent base station or a conventional base station directly connected to the central node, the communication method further includes: performing transparent transmission of protocol data between the second base station and the core network through the central node.

Persons of ordinary skill in the art should understand that all or a part of the steps of the methods according to the embodiments of the present invention may be implemented by a program instructing relevant hardware. The program may be stored in a computer readable storage medium. When the program is run, the steps of the methods according to the embodiments are performed. The storage medium may be any medium that is capable of storing program codes, such as a ROM, a RAM, a magnetic disk, and an optical disk.

Finally, it should be noted that the above embodiments are merely provided for describing the technical solutions of the present invention, but not intended to limit the present invention. It should be understood by persons of ordinary skill in the art that although the present invention is described in detail with reference to the embodiments, modifications can be made to the technical solutions described in the embodiments, or equivalent replacements can be made to some technical features in the technical solutions, as long as such modifications or replacements do not depart from the spirit and scope of the present invention.

What is claimed is:

1. A base station, comprising:
   a central node comprising a network element which is part of the base station; and
   multiple edge nodes, each of the multiple edge nodes comprising a conventional base station and internal management protocol entity for communication with the central node; wherein,
   the multiple edge nodes are configured to perform communication with a user equipment, and execute baseband processing and mutual conversion between baseband data and radio data; wherein the multiple edge nodes belong to one or more edge node groups, and each edge node group comprises at least one edge node; and
   the central node is configured to perform communication with the multiple edge nodes, and manage the multiple edge nodes, except for executing the baseband processing;
   wherein the central node is further configured to obtain a resource condition of each edge node of the base station, determine a resource shortage situation occurs on a first edge node, forward data corresponding to the first edge node to another edge node having idle resources to process so as to implement resources sharing, and group the multiple edge nodes into at least two edge node groups, wherein each edge node group comprises at least one edge node and supports a different communication standard.

2. The base station according to claim 1, wherein if multiple edge node groups exist, each of at least two groups of the multiple edge node groups supports a different communication standard.

3. The method according to claim 1, wherein edge node(s) that belongs to a same edge node group supports a same communication standard.

4. The base station according to claim 1, wherein edge node(s) that belongs to a same edge node group performs exchange of protocol data through the central node.

5. The base station according to claim 1, wherein the central node is further configured to provide a network service function for each edge node of the base station.

6. The base station according to claim 5, wherein the network service function comprises at least one of the following functions: local breakout, deep packet inspect, and network cache.

7. The base station according to claim 1, wherein the central node is further configured to perform at least one type of the following processing: signaling protocol processing, data encapsulation processing, and IPsec processing.

8. The base station according to claim 1, wherein the central node is further configured to output a reference clock to edge nodes belong to the one or more edge node groups.

9. The base station according to claim 1, wherein the central node is further configured to forward data that goes beyond processing capability of the first edge node to the another edge node having the idle resources.

10. A method for managing a base station comprising a central node and multiple edge nodes, and the central node is a network element which is part of the base station, and each of the multiple edge nodes comprising a conventional base station and internal management protocol entity for communication with the central node;
    a part or all of edge nodes in the multiple edge nodes are grouped to obtain one or more edge node groups, wherein each edge node group comprises at least one edge node;
    the central node is configured as one or more logic central nodes;
    one logic central node and at least one edge node group are combined as one logic network element to obtain one or more logic network elements;
    wherein the method comprises:
    performing, by the multiple edge nodes, communication with a user equipment, and executing baseband processing and mutual conversion between baseband data and radio data;

performing, by the central node, communication with the multiple edge nodes except for executing the baseband processing;

obtaining, by the central node, a resource condition of each edge node of the base station;

determining, by the central node, a resource shortage situation occurs on a first edge node; and forwarding, by the central node, data corresponding to the first edge node to another edge node having idle resources to process so as to implement resources sharing;

wherein the multiple edge nodes are grouped into at least two edge node groups, wherein each edge node group comprises at least one edge node and supports a different communication standard.

11. The method according to claim 10, wherein a grouping standard comprises any one of the following:

performing the grouping according to a carrier coordinated multi-point plan;

performing the grouping according to a practical operating physical area of a carrier;

performing the grouping according to management requirements of different communication standards; and performing the grouping according to a sharing strategy in which multiple carriers operate a radio access network together.

12. The method according to claim 10, further comprising:

allocating different logic network elements to different carriers for operation and maintenance.

13. The method according to claim 10, further comprising:

inside any one of the one or more logic network elements, performing clock synchronization on the edge node groups through the combined logic central node.

14. The method according to claim 10, further comprising:

if a part of nodes of the multiple edge nodes are not grouped, configuring the edge nodes that are not grouped as an independent base station, and performing transparent transmission of protocol data between the independent base station and a core network through the central node.

15. The method according to claim 10, further comprising:

providing any one of the one or more logic central nodes with an interface for direct connection to a core network; and/or providing any one of the one or more logic central nodes with an interface for connection to a base station control device, and connecting the base station control device and a core network.

16. The method according to claim 10, further comprising:

implementing exchange of protocol data among the edge nodes belong to a same edge node group through the central node.

17. The method according to claim 10, further comprising:

implementing resource sharing so that resources are shared by the edge nodes belong to a same edge node group through the central node.

18. The method according to claim 10, further comprising:

forwarding data that goes beyond processing capability of the first edge node to the another edge node having the idle resources.

19. A network system, comprising:

a first base station; and a core network, wherein the first base station comprising a central node and multiple edge nodes, and the central node is a network element which is part of the base station, and each of the multiple edge nodes comprising a conventional base station and internal management protocol entity for communication with the central node;

the multiple edge nodes are configured to perform communication with a user equipment, and execute baseband processing and mutual conversion between baseband data and radio data; wherein the multiple edge nodes belong to one or more edge node groups, and each edge node group comprises at least one edge node; and the central node is configured to perform communication with the multiple edge nodes, and manage the multiple edge nodes except for executing the baseband processing;

wherein the central node is further configured to obtain a resource condition of each edge node of the base station, determine a resource shortage situation occurs on a first edge node, and forward data corresponding to the first edge node to another edge node having idle resources to process so as to implement resources sharing;

wherein the central node is further configured to group the multiple edge nodes into at least two edge node groups, wherein each edge node group comprises at least one edge node and supports a different communication standard.

20. The network system according to claim 19, wherein if multiple edge node groups in the first base station exist, each of at least two groups of the multiple edge node groups supports a different communication standard.

21. The network system according to claim 19, wherein in the first base station, exchange of protocol data among edge nodes that belong to a same edge node group is performed through the central node.

22. The network system according to claim 19, wherein the central node is further configured to provide a network service function for each edge node in the first base station.

23. The network system according to claim 22, wherein the network service function comprises at least one of the following functions: local breakout, deep packet inspect, and network cache.

24. The network system according to claim 19, wherein in the first base station, the central node is further configured to output a reference clock to the edge nodes belong to the one or more edge node groups.

25. The network system according to claim 19, wherein the network system further comprises a second base station, the second base station is connected to the central node in the first base station, and the central node is further configured to perform transparent transmission of protocol data between the second base station and the core network.

26. The network system according to claim 19, wherein the network system further comprises a second base station, the second base station is connected to the central node in the first base station, and the central node is further configured to provide a network service function for the second base station.

27. The network system according to claim 19, wherein the central node is further configured to forward data that goes beyond processing capability of the first edge node to the another edge node having the idle resources.

28. A communication method of a network system, wherein the network system comprises a first base station and a core network, wherein the first base station comprising a central node and multiple edge nodes, and the central node is a network element which is part of the base station, and each of the multiple edge nodes comprising a conventional base station and internal management protocol entity for communication with the central node, the edge nodes perform service communication with a user equipment, and execute baseband processing and mutual conversion between baseband data and radio data, the central node performs communication with the edge nodes, manages the edge nodes, and performs resource sharing so that resources are shared by the multiple edge nodes; and the method comprises:
    performing, by the edge nodes belonging to the first base station, communication with the core network through the central node; and
    obtaining, by the central node, a resource condition of each edge node of the base station, determining a resource shortage situation occurs on a first edge node, and forwarding data corresponding to the first edge node to another edge node having idle resources to process so as to implement resources sharing except for executing the baseband processing;
    wherein the multiple edge nodes are grouped into at least two edge node groups, wherein each edge node group comprises at least one edge node and supports a different communication standard.

29. The method according to claim 28, wherein the multiple edge nodes are divided into one or more edge node groups, each edge node group comprises at least one edge node; and the central node is configured as one or more logic central nodes;
    the performing, by the edge nodes, communication with the core network through the central node specifically comprises:
    performing, by any one of the one or more logic central nodes in the one or more logic central node, communication with at least one edge node group;
    directly performing, by the any one of one or more the logic central nodes, communication with the core network; and/or, performing, by the any one of the one or more logic central nodes, communication with the core network through a base station control device.

30. The method according to claim 28, wherein the multiple edge nodes are divided into one or more edge node groups, each edge node group comprises at least one edge node, and the method further comprises:
    in the first base station, performing exchange of protocol data among different edge nodes belong to a same edge node group through the central node.

31. The method according to claim 28, wherein the multiple edge nodes is divided into one or more edge node groups, each edge node group comprises at least one edge node, and data of a same standard is transmitted among the edge nodes belong to a same edge node group and the central node.

32. The method according to claim 28, wherein the network system further comprises a second base station, the second base station is connected to the central node in the first base station, and the method further comprises: performing transparent transmission of protocol data between the second base station and the core network through the central node.

33. The method according to claim 28, further comprising:
    forwarding data that goes beyond processing capability of the first edge node to the another edge node having the idle resources.

* * * * *